United States Patent
Nordback (10) Patent No.: US 10,083,311 B2
(45) Date of Patent: Sep. 25, 2018

(54) CRYPTOGRAPHIC KEY

(71) Applicant: Konica Minolta Laboratory U.S.A., Inc., San Mateo, CA (US)

(72) Inventor: Kurt N. Nordback, Portland, OR (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 286 days.

(21) Appl. No.: 14/320,359

(22) Filed: Jun. 30, 2014

(65) Prior Publication Data
US 2015/0379286 A1    Dec. 31, 2015

(51) Int. Cl.
    *G06F 21/00*      (2013.01)
    *G06F 21/62*      (2013.01)
    *H04L 9/08*      (2006.01)

(52) U.S. Cl.
    CPC ........ *G06F 21/6209* (2013.01); *H04L 9/0872* (2013.01); *G06F 2221/2111* (2013.01)

(58) Field of Classification Search
    CPC ............... H04L 9/0872; H04L 2209/80; G06F 21/6209; G06F 21/602; G06F 2221/2111
    USPC .......................................................... 713/165
    See application file for complete search history.

(56) References Cited

U.S. PATENT DOCUMENTS

| | | | | |
|---|---|---|---|---|
| 6,606,554 | B2* | 8/2003 | Edge .............................. | 701/520 |
| 6,948,062 | B1* | 9/2005 | Clapper ......................... | 713/162 |
| 7,509,491 | B1* | 3/2009 | Wainner ................ | H04L 9/0833 |
| | | | | 713/163 |
| 2005/0198170 | A1* | 9/2005 | LeMay ................. | H04L 63/045 |
| | | | | 709/206 |
| 2007/0030972 | A1* | 2/2007 | Glick et al. ................... | 380/258 |
| 2007/0157309 | A1* | 7/2007 | Bin et al. ........................ | 726/15 |
| 2008/0226070 | A1* | 9/2008 | Herz .................... | H04N 7/1675 |
| | | | | 380/258 |
| 2008/0263363 | A1* | 10/2008 | Jueneman ............... | G06F 21/32 |
| | | | | 713/184 |
| 2013/0145177 | A1* | 6/2013 | Cordella ............. | G06F 12/1408 |
| | | | | 713/193 |
| 2014/0237559 | A1* | 8/2014 | Zhang et al. ...................... | 726/4 |
| 2014/0380047 | A1* | 12/2014 | Denning et al. ............... | 713/168 |
| 2015/0104013 | A1* | 4/2015 | Holman et al. ............... | 380/243 |
| 2017/0264438 | A1* | 9/2017 | Kirshenbaum ....... | H04L 9/3226 |

* cited by examiner

*Primary Examiner* — Mahfuzur Rahman
*Assistant Examiner* — Narciso Victoria
(74) *Attorney, Agent, or Firm* — Osha Liang LLP (57) ABSTRACT

A method for managing a file, including receiving a request to encrypt the file, the request identifying a target location; determining a plurality of coordinates based on the target location; generating a cryptographic key based on the plurality of coordinates; generating an encrypted version of the file using the cryptographic key; and storing the encrypted version of the file.

12 Claims, 7 Drawing Sheets

CRYPTOGRAPHIC KEY

BACKGROUND

It is increasingly common for a file to be generated and then shared with multiple users. This is especially true in the corporate, government, and academic realms; however, there also exists a need to restrict access to these files. In other words, there is a need to prevent unauthorized users from viewing the files.

There have been attempts in the past to prevent unauthorized users from viewing the files; however, most of these attempts rely on encryption using a password. This can be frustrating to an authorized user trying to view the file because the authorized user must remember the password and deal with prompts for the password. Regardless, users still desire the ability to share files and prevent unauthorized users from viewing the files.

SUMMARY

In general, in one aspect, the invention relates to a method for managing a file. The method comprises: receiving a request to encrypt the file, the request identifying a target location; determining a plurality of coordinates based on the target location; generating a cryptographic key based on the plurality of coordinates; generating an encrypted version of the file using the cryptographic key; and storing the encrypted version of the file.

In general, in one aspect, the invention relates to a method for managing a file. The method comprises: receiving a request to encrypt the file, the request identifying a plurality of computing devices having permission to access the file; generating a cryptographic key based on an attribute of the plurality of computing devices; generating an encrypted version of the file using the cryptographic key; and storing the encrypted version of the file.

In general, in one aspect, the invention relates to a method for managing a file. The method comprises: receiving, by a computing device of a plurality of computing devices, a request to decrypt an encrypted version of the file, wherein the encrypted version of the file is generated using an encryption key, and wherein the encryption key is generated using an attribute of the plurality of computing devices specified in a request to encrypt the file; determining, by the computing device, a test attribute of the computing device; generating, by the computing device, a test cryptographic key based on the test attribute; and decrypting, in response to the test cryptographic key equaling the cryptographic key, the encrypted version using the test cryptographic key to obtain the file.

In general, in one aspect, the invention relates to a non-transitory computer readable medium (CRM) storing instructions for managing a file. The instructions comprise functionality for: receiving, by a computing device of a plurality of computing devices, a request to decrypt an encrypted version of the file, wherein the encrypted version of the file is generated using an encryption key, and wherein the encryption key is generated using an attribute of the plurality of computing devices specified in a request to encrypt the file; determining, by the computing device, a test attribute of the computing device; generating, by the computing device, a test cryptographic key based on the test attribute; and decrypting, in response to the test cryptographic key equaling the cryptographic key, the encrypted version using the test cryptographic key to obtain the file.

In general, in one aspect, the invention relates to a system for managing a file. The system comprises: a first computing device, comprising: a first graphical user interface (GUI) that collects a request to encrypt the file, the request identifying a plurality of computing devices having permission to access the file; a first key generation engine that generates an cryptographic key based on an attribute of the plurality of computing devices; and an encryption engine that generates an encrypted version of the file using the cryptographic key; and a second computing device, comprising: a second graphical user interface (GUI) that collects a request to decrypt the encrypted version of the file; a second key generation engine that generates a test cryptographic key based on a test attribute of the second computing device, wherein the plurality of computing devices includes the second computing device; and a decryption engine that decrypts, in response to the test cryptographic key equaling the cryptographic key, the encrypted version using the test cryptographic key to obtain the file.

Other aspects of the invention will be apparent from the following description and the appended claims.

BRIEF DESCRIPTION OF DRAWINGS

FIG. 2.1, FIG. 2.2, and FIG. 3 each show a flowchart in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a system, and a non-transitory computer readable medium for managing a file. Specifically, a request to encrypt the file is received. The request specifies a target location (e.g., building, campus, etc.). Users that are at, near, or within the target location have permission to access (i.e., decrypt) the file. A plurality of coordinates are determined based on the target location. The plurality of coordinates identify/specify a geographical region in which the target location is situated. Moreover, these coordinates are used to generate a cryptographic key to encrypt the file.

At a future time, a request is received to decrypt the encrypted file from a computing device. A plurality of test coordinates are determined based on an actual location of the computing device. The actual location may be determined by a global positioning system (GPS) device on the computing device or through user input. A test cryptographic key is generated from the plurality of test coordinates, and an attempt to decrypt the file using the test cryptographic key is executed.

In general, embodiments of the invention provide a method, a system, and a non-transitory computer readable medium for managing a file. Specifically, a request to encrypt the file is received. The request identifies, either explicitly or implicitly, the computing devices that are permitted to decrypt (i.e., open in plaintext) the file. Then, a cryptographic key is generated based on at least one attribute that is shared by the computing devices. The file is then encrypted using the cryptographic key and stored.

At a future time, a computing device receives a request to decrypt the encrypted version of the file. The request to decrypt may be in the form of a user request to open the file. The user might not even be aware that the file is encrypted. In response to the request, a test attribute for the computing device is determined. The test attribute is an attribute possessed by the computing device that would also be possessed by all other computing devices having permission to decrypt the file. For example, the test attribute may correspond to a prefix of the computing device's internet protocol (IP) address. As yet another example, the test attribute may correspond to a group email address that includes the email address of the user currently operating (i.e., logged into) the computing device. A test cryptographic key is generated based on at least the test attribute. If the test cryptographic key and the cryptographic key match, because the attribute and the test attribute match, the file is decrypted and opened for the user. The entire decryption process may be hidden from the user of the computing device.

Figure 1:
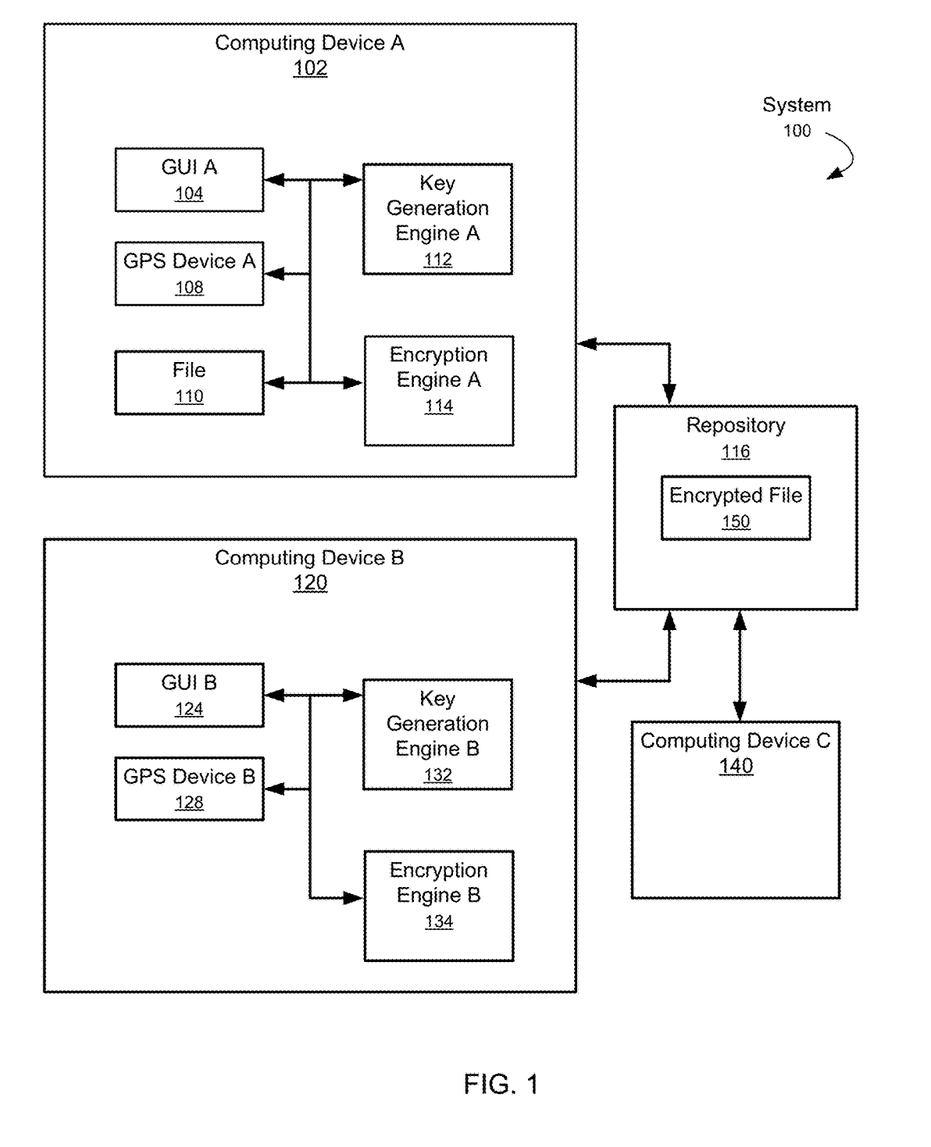
FIG. 1 shows a system in accordance with one or more embodiments of the invention.

FIG. 1 shows a system (100) in accordance with one or more embodiments of the invention. As shown in FIG. 1, the system has multiple components including multiple computing devices (i.e., Computing Device A (102), Computing Device B (120), and Computing Device C (140)) and a repository (116). Each of the computing devices (102, 120, 140) may correspond to a personal computer (PC), a laptop, a smart phone, a personal digital assistance (PDA), a kiosk, a tablet PC, a mainframe, a server, an electronic reader (e-reader), an email server, or any other hardware device. The repository (116) may correspond to a hard drive, tape, memory, a database, etc. All of the computing devices (102, 120, 140) may be connected to the repository (116) using one or more networks (not shown) having wired and/or wireless segments. In one or more embodiments, the repository (116) is located on one of the computing devices (102, 120, 140).

In one or more embodiments of the invention, the system (100) includes computing device A (102). As shown in FIG. 1, computing device A (102) has multiple components including graphical user interface (GUI) A (104), GPS device A (108), a file (108), key generation engine A (112), and encryption engine A (114). Each of these components is discussed below.

In one or more embodiments of the invention, the file (110) is generated or obtained by a user application (not shown) executing on computing device A (102). Accordingly, the file (110) may correspond to a word processing document, a spreadsheet, a slide show presentation, an image, a photograph, an audio clip, a video clip, etc. Moreover, the file (110) may have any format including Open Office XML (OOXML), Portable Document Format (PDF), Open Document Format (ODF), Graphics Interchange Format (GIF), Joint Photographic Experts Group (JPEG) format, etc.

In one or more embodiments of the invention, computing device A (102) includes GUI A (104) having one or more widgets (e.g., drop down lists, text boxes, radio buttons, etc.). GUI A (104) may collect a request to encrypt the file (110) from the user. Specifically, the user may issue a request to encrypt the file (110) by manipulating one or more of the widgets. In one or more embodiments of the invention, the request may specify/identify a target location (e.g., a building, corporate campus, etc.). Users that are at, near, or within the target location have permission to access the encrypted file (discussed below). The target address may be specified by a mailing address or by coordinates (e.g., GPS coordinates) specifying the center of the building/campus or a point on the perimeter of the building/campus.

In one or more embodiments of the invention, the request may specify/identify computing devices that are permitted to decrypt the file (110). For example, the request may specify multiple IP addresses. A computing device having one of these IP addresses is authorized to decrypt the file (110). As yet another example, the request may specify a group email address. In such examples, a computing device being operated by a user with an email address that is a member of the group email address is permitted to decrypt the file (110).

In one or more embodiments of the invention, computing device A (102) includes GPS device A (108). GPS device A (108) is configured to obtain the GPS coordinates identifying a geographic region in which the target location is situated. In one or more embodiments of the invention, these coordinates are obtained by first identifying the GPS coordinates of the building or campus specified in the encryption request, and then "rounding" the GPS coordinates of the building/campus to a coarser granularity. The rounded GPS coordinates correspond to a geographical region of approximately rectangular shape in which the target location is situated.

Although embodiments in this detailed description have focused on GPS coordinates, those skilled in the art, having the benefit of this detailed description, will appreciate that other coordinate systems may also be used.

In one or more embodiments of the invention, computing device A (102) includes key generation engine A (112). Key generation engine A (112) is configured to generate a cryptographic key based on GPS coordinates identifying the geographical region in which the target location is situated. In such embodiments, the cryptographic key may be generated by converting the latitude and longitude of the rounded GPS coordinates to string format, and then concatenating the strings. A hash function may also be applied.

Additionally or alternatively, key generation engine A (112) is configured to generate a cryptographic key based on one or more attributes that are shared by the authorized computing devices. For example, the shared attribute may correspond to an IP address prefix that is common to the IP addresses of the authorized computing devices. In such embodiments, the cryptographic key may correspond to the IP address prefix itself or the IP address prefix concatenated with either a predetermined value or even another shared attribute (e.g., GPS coordinates). A hash function may also be applied.

As yet another example, the shared attribute may correspond to a group email address. The group email address may correspond to everyone employed in a human resources (HR) department of a business, an engineering department, or a legal department, etc. A computing device is an authorized computing device if it is being operated by a user with an email address that is a member of the group email address. In such embodiments, the cryptographic key may correspond to the group email address itself or the group email address concatenated with a predetermined value or even another shared attribute (e.g., GPS coordinates, IP address prefix, etc.). A hash function may also be applied.

In one or more embodiments of the invention, computing device A (102) may include encryption engine A (114). The encryption engine A (114) is configured to generate an encrypted version of the file (110) (i.e., encrypted file (150)) using the cryptographic key. The encryption engine A (114) may use one or more algorithms to perform the encryption. Moreover, the user of computing device A (102) may select (e.g., using GUI A (104)) the encryption algorithm to be used. Encryption algorithms may be added or updated at any time and by any entity (e.g., user, network administrator, manufacturer, etc.). Encryption engine A (114) may store the encrypted file (150) in the repository (116).

In one or more embodiments of the invention, the encryption engine A (114) is configured to embed the instructions and/or parameters to generate the cryptographic key into the encrypted file (150). These instructions are for the benefit of a computing device attempting to decrypt (i.e., "decryption computing device") the encrypted file (150). For example, the instructions may include instructions to obtain the GPS coordinates (i.e., actual location) of the decryption computing device, round the obtained GPS coordinates, convert each of the rounded GPS coordinates to a string, and concatenate the strings. As another example, the instructions may include instructions to obtain the IP address of the decryption computing device and truncate all but the first K bits of the IP address. As yet another example, the instructions may include instructions to obtain the email address of the user operating the decryption computing device, identify an email group (e.g., by accessing an email server) in which the user is a member, and then obtaining the group email address for the group. The instructions/parameters may be embedded as plaintext within the encrypted file (150) and thus may be read/followed without decrypting the encrypted file (150).

In one or more embodiments of the invention, all or some components (104, 108, 112, 114) of computing device A (102) are modules of the user application (not shown) that obtains or generates the file (110).

In one or more embodiments of the invention, the system (100) includes computing device B (120). Computing device B (120) may be authorized to decrypt the encrypted file (150). As shown in FIG. 1, computing device B (120) has multiple components, including, graphical user interface (GUI) B (124), GPS device B (128), key generation engine B (132), and encryption engine B (134). Each of these components is discussed below.

In one or more embodiments of the invention, computing device B (120) includes GUI B (124) having widgets (e.g., drop down lists, text boxes, radio buttons, etc.). GUI B (124) may collect a request to decrypt the encrypted file (150) from the user of computing device B (120). Specifically, the user may issue a request to decrypt the encrypted file (150) by manipulating one or more of the widgets. In one or more embodiments, the user is unaware of the encryption. In such embodiments, the request from the user is a request to open the encrypted file (150).

In one or more embodiments, computing device B (120) includes GPS device B (128). GPS device B (128) is configured to obtain the actual location (e.g., GPS coordinates) of computing device B (120). GPS device B (128) is also configured to identify, from the actual location, the GPS coordinates of the geographical region in which computing device B (120) is located. Specifically, GPS device B (128) may "round" the GPS coordinates of the actual location of computing device B (120) to a coarser granularity. The rounded GPS coordinates correspond to a geographical region of approximately rectangular shape, in which computing device B (120) is located. The rounded GPS coordinates determined by computing device B (120) may be referred to as test coordinates.

When GPS device B (128) is malfunctioning and/or unable to connect to GPS satellites, GPS device B (128) may be unable to obtain the actual location of computing device B (128). In such embodiments, the actual location of computing device B (128) may be obtained using GUI B (124). Specifically, GUI B (124) may display a map and request the user to identify the actual location of computing device B (128) on the map. The coordinates of the actual location may then be determined from the selection point on the displayed map.

In one or more embodiments of the invention, computing device B (120) includes key generation engine B (132). The key generation engine B (132) is configured to generate a test cryptographic key. As discussed above, the encrypted file (150) may include instructions and/or parameters for generating the test cryptographic key.

In one or more embodiments of the invention, key generation engine B (132) is configured to generate a test cryptographic key based on the test coordinates. In such embodiments, the test cryptographic key may be generated by converting the rounded latitude and longitude of the GPS coordinates to string format, and then concatenating the strings. A hash function may also be applied.

In one or more embodiments of the invention, key generation engine B (132) is configured to generate a test cryptographic key from one or more test attributes of computing device B (120). In general, a test attribute is an attribute posses by all authorized computing devices (i.e., all computing devices having permission to decrypt the encrypted file (150)). For example, the test attribute may correspond to a prefix of computing device B's (120) IP address. In such embodiments, the test cryptographic key may correspond to the IP address prefix itself or the IP address prefix concatenated with a predetermined value or even another test attribute (e.g., GPS coordinates). A hash function may also be applied.

As yet another example, the test attribute may correspond to a group email address. The group email address is identified by first identifying an email address of the user operating computing device B (120), and then accessing a contact list mapping the email address to the group email address. In such embodiments, the test cryptographic key may correspond to the group email address itself or the group email address concatenated with a predetermined value, or even another shared attribute (e.g., GPS coordinates, IP address prefix, etc.). A hash function may also be applied.

In one or more embodiments of the invention, computing device B (120) includes encryption engine B (134). The encryption engine B (134) is configured to decrypt, or at least attempt to decrypt, the encrypted file (150) using the test cryptographic key. The user of computing device B (120) may be unaware of the decryption process. If decryption is successful, the file (110) may open in plaintext for the user without the user being prompted for passwords, PINs, biometrics, or any other authorization credentials.

As discussed above, the instructions for generating the test cryptographic key may be embedded as plaintext in the encrypted file (150). Additionally or alternatively, the instructions for generating the test cryptographic key may be pre-installed on computing device B (134), specified by the operator of computing device B (134), and/or sent to the computing device B (134) in advance by email, short message service (SMS), etc.

In one or more embodiments of the invention, the system (100) includes computing device C (140). Computing device C (140) may be essentially the same as computing device B (120). In other words, computing device C (140) may have some or all of the components (124, 128, 132, 134) of computing device B (120). Moreover, like computing device B (120), computing device C (140) may be an authorized computing device.

Figure 21:
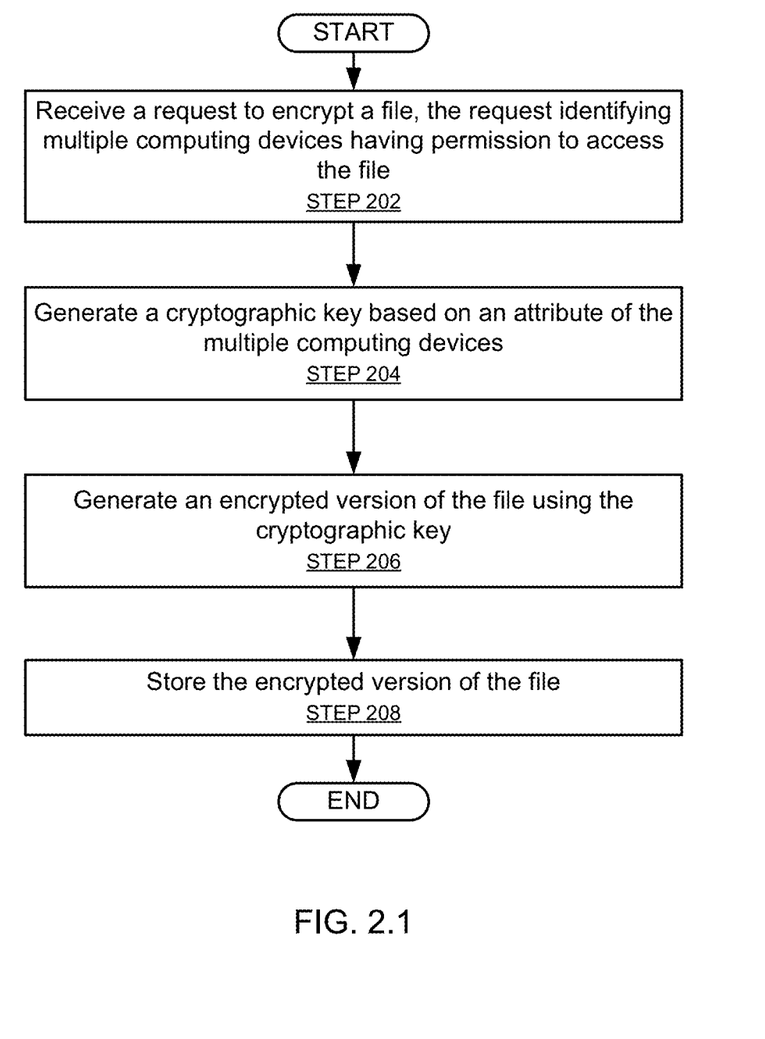

FIG. 2.1 shows a flowchart in accordance with one or more embodiments of the invention. The flowchart depicts a process for managing a file. One or more of the steps in FIG. 2.1 may be performed by the components of the system (100), discussed above in reference to FIG. 1. In one or more embodiments of the invention, one or more of the steps shown in FIG. 2.1 may be omitted, repeated, and/or performed in a different order than the order shown in FIG. 2.1. Accordingly, the scope of the invention should not be considered limited to the specific arrangement of steps shown in FIG. 2.1.

Initially, a request to encrypt a file is received (STEP 202). The request may be issued by a user manipulating a GUI. Moreover, the request may specify/identify computing devices that are permitted to decrypt the encrypted version of the file. For example, the request may specify multiple IP addresses. A computing device having one of these IP addresses is authorized to decrypt the file. As yet another example, the request may specifying a group email address. In such examples, a computing device being operated by a user with an email address that is a member of the group email address is permitted to decrypt the file.

In STEP 204, a cryptographic key is generated based on an attribute (i.e., shared attribute) of the multiple computing devices. As discussed above, the shared attribute may correspond to an IP address prefix that is common to the IP addresses of the authorized computing devices. As yet another example, the shared attribute may correspond to a group email address. The cryptographic key may correspond to the shared attribute itself, or may be generated by concatenating the shared attribute with a predetermined value and/or other shared attributes. Moreover, the cryptographic key may be the result of applying a hash function to the shared attribute or the concatenation.

In STEP 206, the file is encrypted using the cryptographic key. The file may correspond to a word processing document, a spreadsheet, a slide show presentation, an image, a photograph, etc. Moreover, the file may have any format. One or more algorithms may be used to perform the encryption and the user may select the encryption algorithm to be used. The instructions and/or parameters for generating the cryptographic key may be embedded as plaintext within the encrypted version of the file.

In STEP 208, the encrypted version of the file is stored. The storage location of the encrypted file may be specified by the user. The encrypted file may be stored in a repository that is internal or external to the computing device that created the encrypted file.

Figure 22:
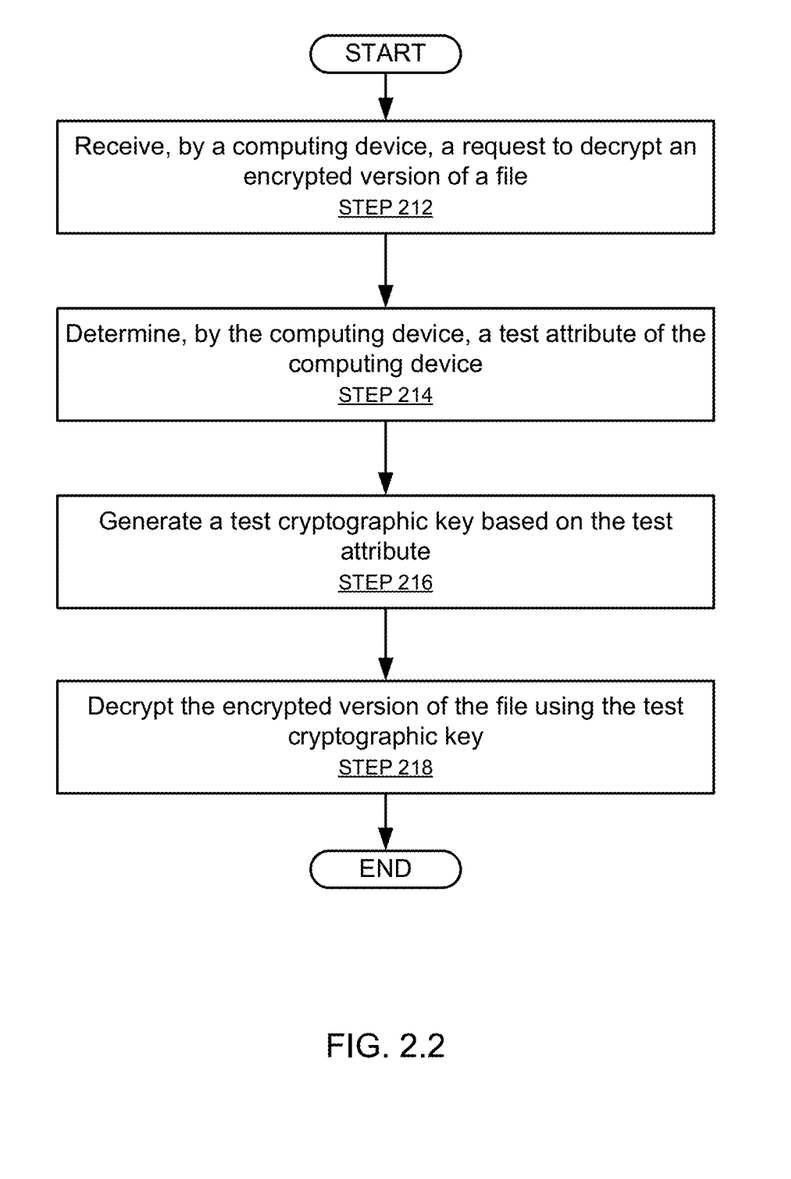

FIG. 2.2 shows a flowchart in accordance with one or more embodiments of the invention. The flowchart depicts a process for managing a file. One or more of the steps in FIG. 2.2 may be performed by the components of the system (100), discussed above in reference to FIG. 1. In one or more embodiments of the invention, one or more of the steps shown in FIG. 2.2 may be omitted, repeated, and/or performed in a different order than the order shown in FIG. 2.2. Accordingly, the scope of the invention should not be considered limited to the specific arrangement of steps shown in FIG. 2.2. In one or more embodiments of the invention, some or all of the steps in FIG. 2.2 are performed after the steps in FIG. 2.1.

Initially, a request is received by a computing device to decrypt an encrypted version of the file (STEP 212). The request may be issued by a user operating a GUI executing on the computing device. The encrypted version of the file may be stored in repository that is external to the computing device.

In STEP 214, a test attribute of the computing device is determined. As discussed above, a test attribute is an attribute possessed by all authorized computing devices (i.e., all computing devices having permission to decrypt the encrypted file) and by a minimal set of unauthorized computing devices. As also discussed above, multiple test attributes may exist and thus there are multiple ways to determine the test attributes. Moreover, the identity of the test attribute(s) and instructions for obtaining the test attribute(s) may be embedded as plaintext in the encrypted file.

For example, o the test attribute may correspond to a prefix of the computing device's IP address. In this example, the test attribute is determined by first determining the IP address of the computing device, and then truncating the final N bits that are not required.

As yet another example, the test attribute may correspond to a group email address. In this example, the test attribute is determined by first determining an email address of a user operating the computing device, and then identifying email groups that include the user as a member.

In STEP 216, a test cryptographic key is generated based on one or more of the test attributes. As discussed above, the instruction(s) for generating the test cryptographic key may be embedded as plaintext within the encrypted file.

If the test attribute is an IP address prefix, the cryptographic key may correspond to the IP address prefix itself or the IP address prefix concatenated with a predetermined value or even another shared attribute (e.g., GPS coordinates). If the test attribute is a group email address, the cryptographic key may correspond to the group email address itself or the group email address concatenated with a predetermined value or even another shared attribute (e.g., GPS coordinates, IP address prefix, etc.).

In STEP 218, the encrypted version of the file is decrypted using the test cryptographic key. Those skilled in the art, having the benefit of this detailed description, will appreciate that the decryption will only be successful if the test cryptographic key matches the cryptographic key (i.e., STEP 204, as discussed above in reference to FIG. 2.1). Moreover, if the test cryptographic key does match the cryptographic key, it is because the test attribute matches the shared attribute, meaning the computing device is authorized to decrypt the file. As discussed above, the user operating the computing device may not be aware that the process in FIG. 2.2 is being executed. In other words, the user might not be prompted for passwords, PINs, biometrics, or other authorization credentials. Instead, if decryption is successful, the file will open in plaintext.

Figure 3:
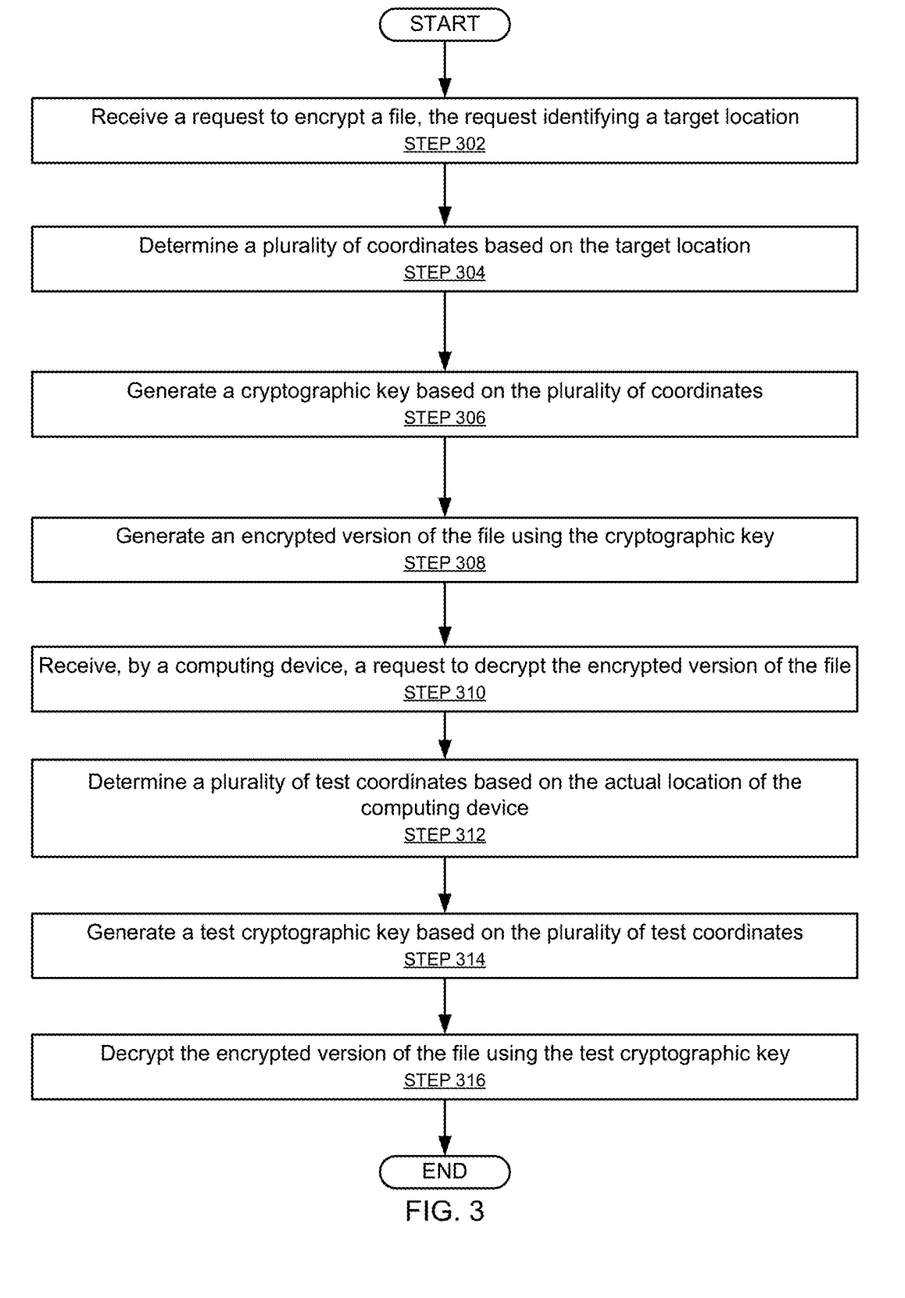

FIG. 3 shows a flowchart in accordance with one or more embodiments of the invention. The flowchart depicts a process for managing a file. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a request to encrypt the file is received (STEP 302). The request may be received via a GUI operated/manipulated by a user. Further, the request may specify/identify a target location. Users at, near, or within the target location have permission to access (i.e., decrypt) the file. For example, the target location may be a building or a campus. The target location may be specified using a mailing address of the building or campus. The target location may also be specified using the coordinates (e.g., GPS coordinates) of the center of the campus/building or a point (e.g., corner) along the perimeter of the building/campus.

In STEP 304, a plurality of coordinates are determined from the specified target location. The plurality of coordinates identify a geographic region in which the target location is situated. In one or more embodiments of the invention, these coordinates are obtained by first identifying the GPS coordinates of the center or a point on the perimeter of the building or campus (if they were not specified in the encryption request), and then "rounding" the GPS coordinates of the building/campus to a coarser granularity. The rounded GPS coordinates correspond to a geographical region of approximately rectangular shape in which the target location (e.g., building or campus) is situated.

In STEP 306, a cryptographic key is generated based on the plurality of coordinates. For example, the cryptographic key may be generated by converting each of the rounded GPS coordinates to strings, and then concatenating the string. A hash function may be applied to the concatenated string.

In STEP 308, the file is encrypted using the cryptographic key. The file may correspond to a word processing document, a spreadsheet, a slide show presentation, an image, a photograph, a video clip, etc. Moreover, the file may have any format. One or more algorithms may be used to perform the encryption and the user may select the encryption algorithm to be used. The instructions and/or parameters for generating the encryption key may be embedded as plaintext within the encrypted version of the file.

At a future time, in STEP 310, a request to decrypt the encrypted version of the file is received by a computing device. The computing device may be the same or a different computing device than the computing device that was used in STEPS 302, 304, 306, and 308. The request may be collected from a GUI being manipulated by a user operating the computing device.

In STEP 312, a plurality of test coordinates are determined by the computing device. Determining the plurality of test coordinates may include first determining the coordinates of the actual location of the computing device, and then "rounding" the coordinates of the actual location to a coarser granularity. The rounded GPS coordinates correspond to a geographical region of approximately rectangular shape in which the actual location is situated. The coordinates of the actual location may be determined by a GPS device installed on the computing device. The coordinates of the actual location may also be determined from user input. Specifically, the user may select the actual location of the computing device from a map displayed on the computing device. The coordinates of the actual location may be determined based on the user's selection within the displayed map. The instructions for determining the plurality of test coordinates may be embedded as plaintext within the encrypted file.

In STEP 314, a test cryptographic key is generated from the plurality of test coordinates. The instructions for generating the test cryptographic key may be embedded as plaintext in the encrypted file. Additionally or alternatively, the instructions for generating the test cryptographic key may be submitted to the computing device by email, SMS, etc. In one or more embodiments of the invention, the test cryptographic key is generated by converting the plurality of test coordinates to a plurality of strings, and then concatenating the strings. A hash function may also be applied to the concatenation of strings.

In STEP 316, the encrypted version of the file is decrypted using the test cryptographic key. Those skilled in the art, having the benefit of this detailed description, will appreciate that the decryption will only be successful if the test cryptographic key matches the cryptographic key (i.e., STEP 306). Moreover, if the test cryptographic key does match the cryptographic key, it is because the actual location of the computing device is not at, near, or within the target location, and thus the user is not authorized to decrypt the file.

Figure 4:
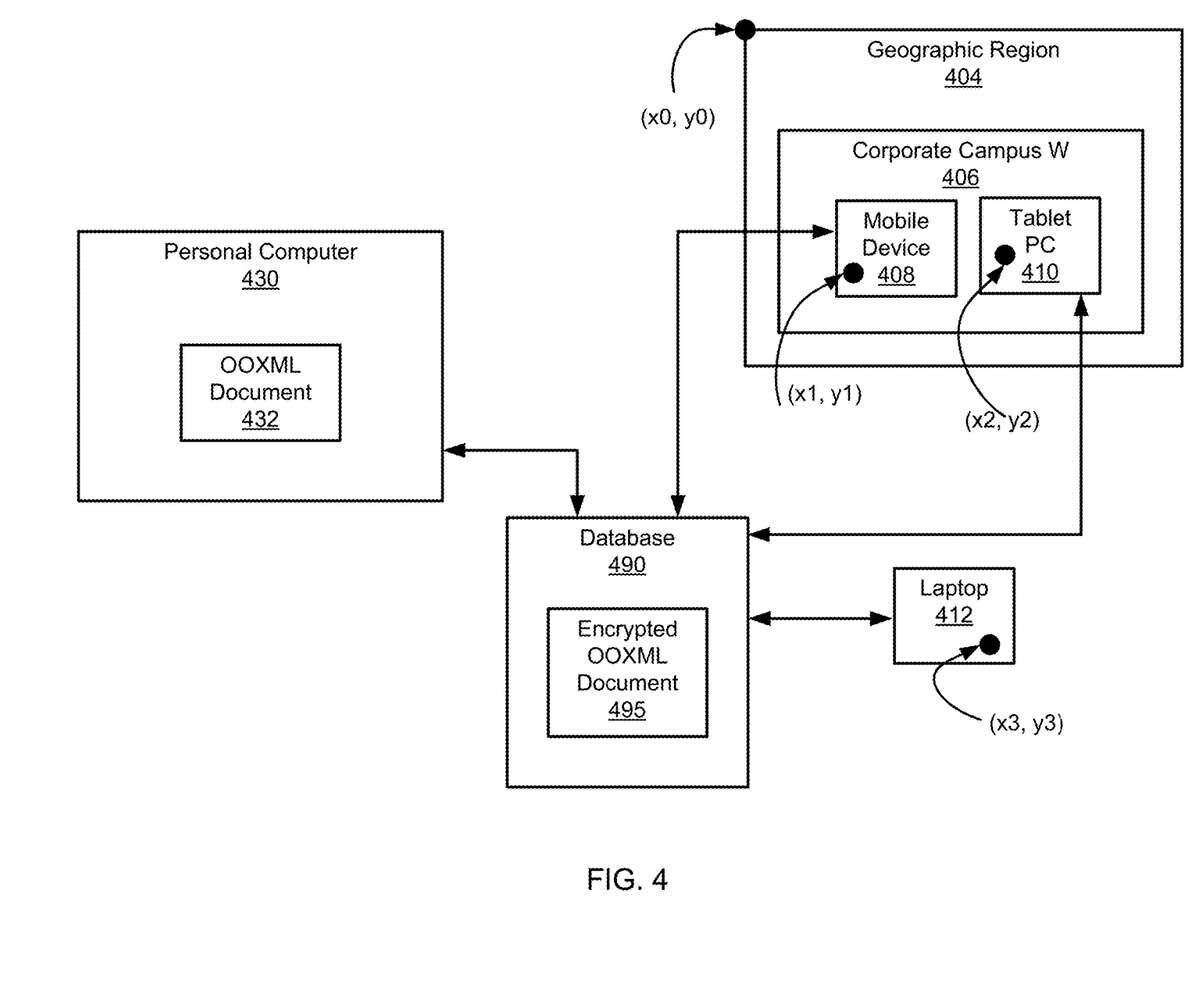
FIG. 4 and FIG. 5 show examples in accordance with one or more embodiments of the invention.

FIG. 4 shows an example in accordance with one or more embodiments of the invention. As shown in FIG. 4, there exists a personal computer (PC) (430), a database (490), a mobile device (408), a tablet PC (410), and a laptop (412). The database (490) is accessible to the PC (430), the mobile device (408), the tablet PC (410), and the laptop (412). The PC (430) may correspond to computing device A (102), as discussed above in reference to FIG. 1. Each of the mobile device (408), the tablet PC (410), and the laptop (412) may correspond to the computing device B (120) or the computing device C (140), as discussed above in reference to FIG. 1.

Still referring to FIG. 4, both the mobile device (408) and the tablet PC (410) are located on corporate campus W (406). Moreover, corporate campus W (406) is located within the approximately rectangular geographic region (404). GPS coordinates (x0, y0) identify the geographic region (404).

Assume the user operating the PC (430) issues a request to encrypt OOXML document (432). Moreover, assume the request identifies corporate campus W (406) by mailing address. In other words, corporate campus W (406) is the target location and users that are at, near, or within corporate campus W (406) have permission to access (i.e., decrypt) the encrypted file. Assume also the request specifies an east-west dimension U and a north-south dimension V for the desired geographic region. In response to the encryption request, the PC (430) identifies (i.e., looks up) the GPS coordinates for corporate campus W (406), and then rounds these coordinates based on the values U and V to obtain the GPS coordinates (x0, y0) of geographic region (404). This set of GPS coordinates (x0, y0) identifies the geographic region (404) in which the target location is situated.

The PC (430) then generates a cryptographic key by first converting the components of this set of GPS coordinates (x0, y0) to string format, and then concatenating the strings. The encrypted OOXML document (495) is generated by encrypting the OOXML document (432) using the cryptographic key. The rounding quantization values U and V are attached to the encrypted OOXML document in plaintext (i.e., not encrypted).

At a future time, the user operating the mobile device (408) issues a request to open the encrypted OOXML document (495). The user operating the mobile device (408) is unaware of the encryption and is not prompted for authorization credentials. However, in response to the request to open, the mobile device (408) determines the actual location (x1, y1) of the mobile device (408). Then, the mobile device (408) rounds this location (x1, y1) using the values U and V that were included in the transmitted file.

The result of the rounding is the set of GPS coordinates (x0, y0) for the geographic region (404) because the mobile device (408) is within the geographic region (404). In other words, the test coordinates are the set of GPS coordinates (x0, y0) identifying the geographic region (404).

Similarly, the user operating the tablet PC (410) issues a request to open the encrypted OOXML document (495). The user operating the tablet PC (410) is unaware of the encryption and is not prompted for authorization credentials. However, in response to the request to open, the tablet PC (410) determines the actual location (x2, y2) of the tablet PC (410). Then, the tablet PC (410) rounds this location (x2, y2). The result of the rounding is the set of GPS coordinates (x0, y0) for the geographic region (404) because the tablet PC (410) is within the geographic region (404). In other words, the test coordinates are the set of GPS coordinates (x0, y0) identifying the geographic region (404).

Similarly, the user operating the laptop (412) issues a request to open the encrypted OOXML document (495). The user operating the laptop (412) is unaware of the encryption and is not prompted for authorization credentials. However, in response to the request to open, the laptop (412) determines the actual location (x3, y3) of the laptop (412). Then, the laptop (412) rounds this location (x3, y3). The result of the rounding is not the set of GPS coordinates (x0, y0) because the tablet PC (410) is not within the geographic region (404). In other words, the test coordinates are not the set of GPS coordinates (x0, y0) identifying the geographic location (404).

The mobile device (408), the tablet PC (410), and the laptop (412) each generate a test cryptographic key based on their respective test coordinates. The mobile device (408), the tablet PC (410), and the laptop (412) then attempt to decrypt the encrypted OOXML document (495) using their respective test cryptographic keys. The tablet PC (410) and the mobile device (408) will be successful in the decryption because both the mobile device (408) and the tablet PC (410) are located within the target location (i.e., corporate campus W (406)). However, the laptop (412) will not be successful because it is not within corporate campus W (406).

Figure 5:
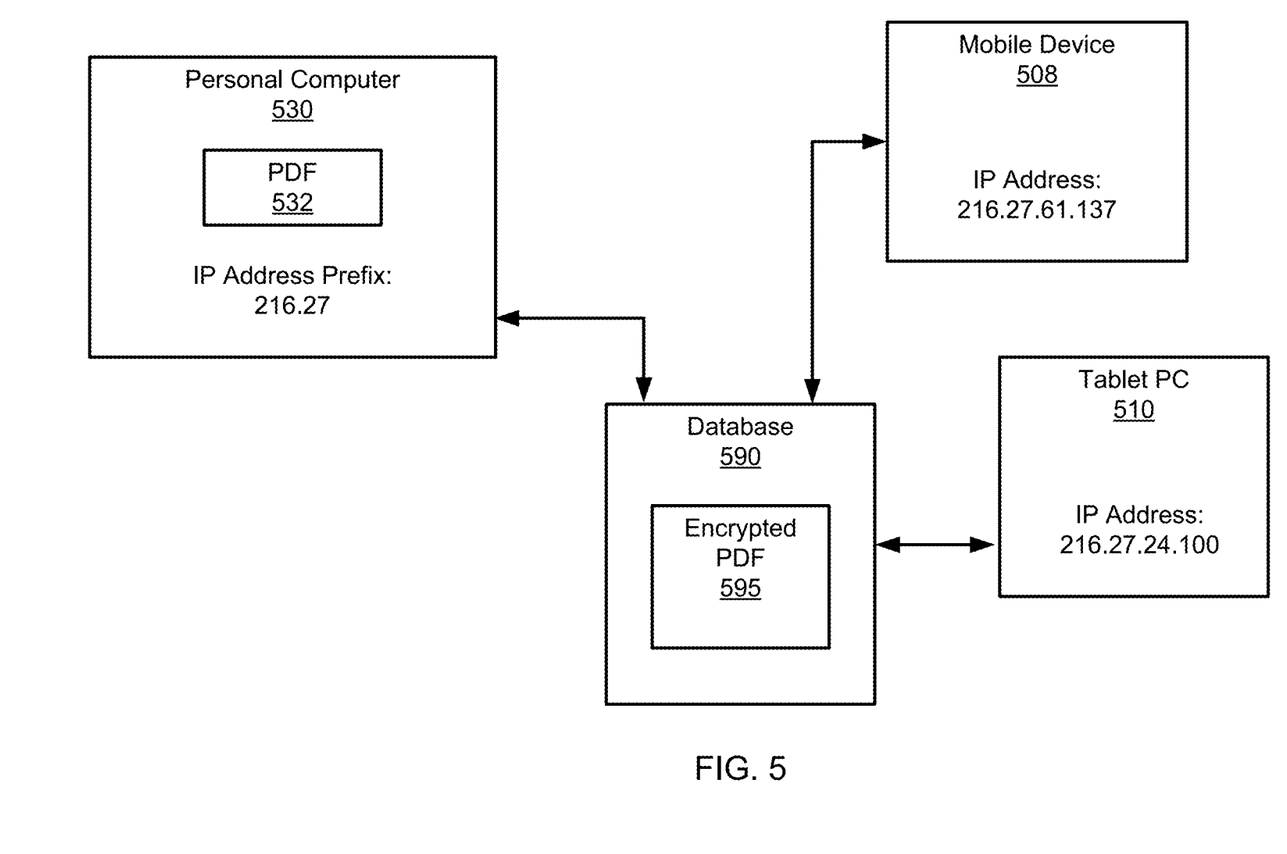

FIG. 5 shows an example in accordance with one or more embodiments of the invention. As shown in FIG. 5, there exists a personal computer (PC) (530), a database (590), a mobile device (508), and a tablet PC (510). The database (590) is accessible to the PC (530), the mobile device (508), and the tablet PC (510). The PC (530) may correspond to computing device A (102), as discussed above in reference to FIG. 1. Each of the mobile device (508) and the tablet PC (510) may correspond to computing device B (120) or computing device C (140), as discussed above in reference to FIG. 1.

Still referring to FIG. 5, the mobile device (508) has an IP address of 216.27.61.137. The tablet PC (510) has an IP address of 216.27.24.100. Assume a user of the PC (530) issues a request to encrypt the PDF document (532). The request identifies multiple IP addresses including the IP addresses of both the mobile device (508) and the tablet PC (510). In other words, the request explicitly identifies the mobile device (508) and the tablet PC (510) as being authorized computing devices. In response to the encryption request, the personal computer identifies a prefix that is common to all of the specified IP addresses (i.e., 216.27). This IP address prefix is the attribute (i.e., shared attribute) of the authorized computing devices.

The PC (530) then generates a cryptographic key by applying a hash function to the IP address prefix. The encrypted PDF document (595) is generated by encrypting the PDF document (532) using the cryptographic key.

At a future time, the user operating the mobile device (508) issues a request to open the encrypted PDF document (595). The user operating the mobile device (508) is unaware of the encryption and is not prompted for authorization credentials. However, in response to the request to open, the mobile device (508) determines a test attribute of the mobile device (508). Specifically, the mobile device (508) identifies the IP address of the mobile device (508) and truncates all but the prefix. The test attribute for the mobile device (508) is this IP address prefix.

Similarly, the user operating the tablet PC (510) issues a request to open the encrypted PDF document (595). The user operating the tablet PC (510) is unaware of the encryption and is not prompted for authorization credentials. However, in response to the request to open, the tablet PC (510) determines a test attribute of the tablet PC (510). Specifically, the tablet PC (510) identifies the IP address of the tablet PC (510) and truncates all but the prefix. The test attribute for the tablet PC (510) is this IP address prefix.

The mobile device (508) and the tablet PC (510) each generate a test cryptographic key based on their respective test attributes. The mobile device (508) and the tablet PC (510) then attempt to decrypt the encrypted PDL document (595) using their respective test cryptographic keys. The tablet PC (510) and the mobile device (508) will be successful in the decryption because both the mobile device (508) and the tablet PC (510) have IP addresses that were specified by the user of the PC (530), and both the mobile device (508) and the tablet PC (510).

Embodiments of the invention may have one or more of the following advantages: the ability to specify authorized computing devices in an encryption request, the ability to generate a cryptographic key based on location, IP address, and/or group email address, and the ability to conceal encryption from the user and prevent the user from being prompted for passwords, PINS, biometrics or other authorization credentials.

Figure 6:
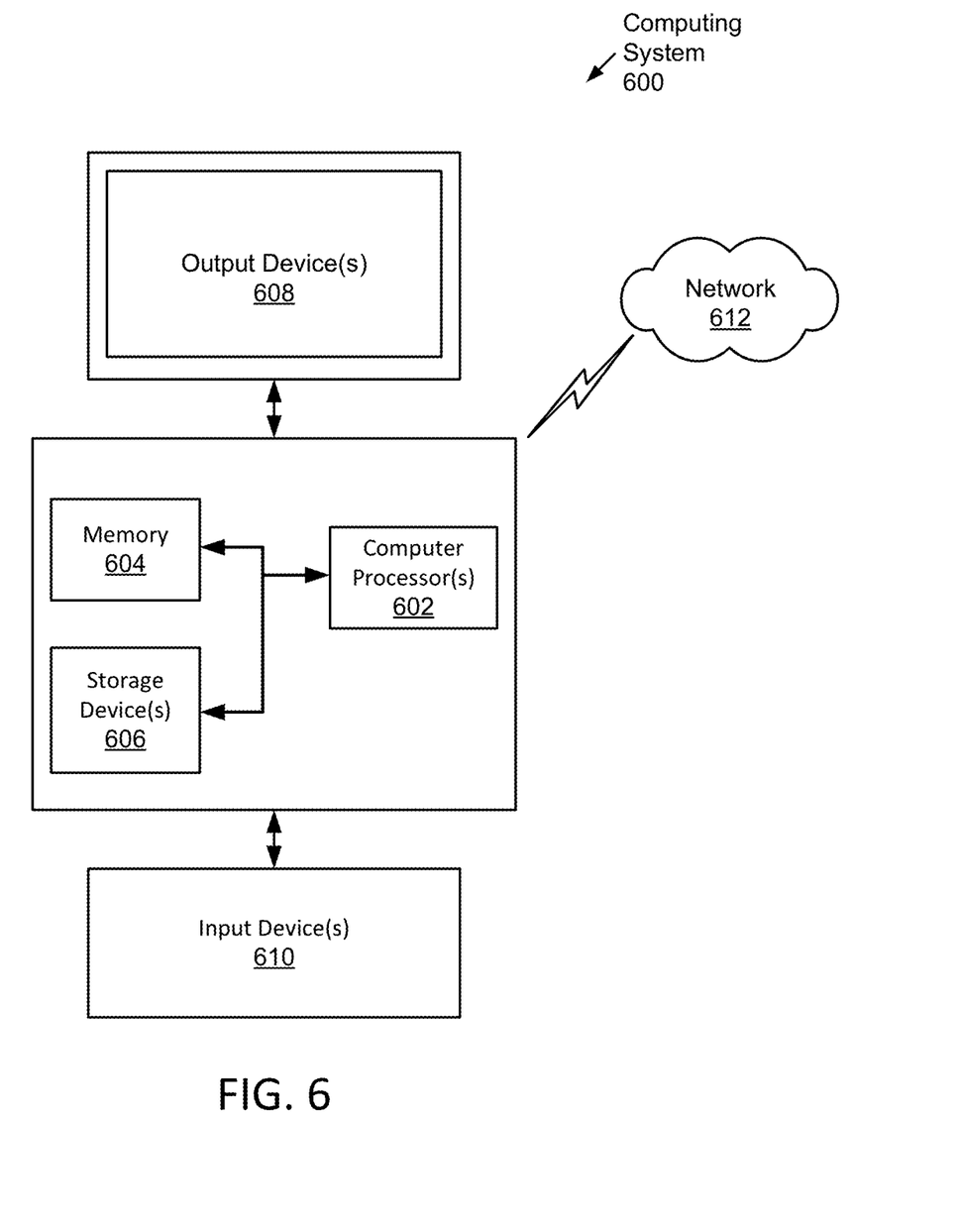
FIG. 6 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for limiting access to a file within a target location, comprising:
    receiving, by a first computing device, a request to encrypt the file, the request identifying the target location;
    determining, by the first computing device, a plurality of coordinates based on the target location;
    generating, by the first computer device and by rounding the plurality of coordinates to a coarser granularity, a plurality of rounded coordinates corresponding to a geographical region comprising the target location;
    generating, by the first computer device, a cryptographic key comprising the plurality of rounded coordinates;
    generating, by the first computer device, an encrypted version of the file using the cryptographic key;
    storing, by the first computer device, the encrypted version of the file in a storage device;
    receiving, by a second computing device, a request to decrypt the encrypted version of the file;
    determining, by the second computing device, a plurality of test coordinates based on an actual location of the second computing device;
    generating, by the second computing device and by rounding the plurality of test coordinates, a plurality of rounded test coordinates corresponding to the geographical region;
    generating, by the second computing device, a test cryptographic key comprising the plurality of rounded test coordinates; and
    decrypting, by the second computing device and in response to the test cryptographic key equaling the cryptographic key, the encrypted version using the test cryptographic key to obtain the file.

2. A method for limiting access to a file based on an internet protocol (IP) address prefix, comprising:
    receiving a request to encrypt the file, the request identifying a plurality of computing devices having permission to decrypt an encrypted version of the file;
    generating a cryptographic key comprising the IP address prefix shared by the plurality of computing devices;
    generating the encrypted version of the file using the cryptographic key;
    storing the encrypted version of the file in a storage device;
    obtaining a plurality of coordinates specifying a geographic region comprising the plurality of computing devices using a first global positioning system (GPS) device, wherein the cryptographic key further comprises the plurality of coordinates;
    receiving, by a computing device of the plurality of computing devices, a request to decrypt the encrypted version of the file;
    determining, by the computing device, an IP address prefix of the computing device;
    generating, by the computing device, a test cryptographic key comprising the IP address prefix of the computing device;
    decrypting, by the computing device and in response to the test cryptographic key equaling the cryptographic key, the encrypted version using the test cryptographic key to obtain the file;
    determining, by the computing device, a location of the computing device using a second GPS device; and
    mapping, by the computing device, the location to the plurality of coordinates of the geographic region,
    wherein the test cryptographic key further comprises the plurality of coordinates.

3. The method of claim 2, wherein the request to encrypt identifies at least one selected from a group consisting of a campus within the geographic region and a building within the geographic region.

4. The method of claim 2, further comprising:
    determining, by the computing device, an email address of a user operating the computing device; and
    mapping, by the computing device, the email address to a group email address,
    wherein the request to encrypt specifies the group email address,
    wherein the cryptographic key further comprises the group email address, and
    wherein the test cryptographic key further comprises the group email address.

5. The method of claim 4, wherein the group email address corresponds to at least one selected from a group consisting of a human resources (HR) department of a business, an engineering department, and a legal department.

6. A method for limiting access to a file based on an internet protocol (IP) address prefix, comprising:

receiving, by a computing device of a plurality of computing devices, a request to decrypt an encrypted version of the file, wherein the encrypted version of the file is generated using a cryptographic key, and wherein the cryptographic key comprises the IP address prefix of the plurality of computing devices specified in a request to encrypt the file, the request identifying the plurality of computing devices having permission to decrypt an encrypted version of the file;

determining, by the computing device, an IP address prefix of the computing device;

generating, by the computing device, a test cryptographic key comprising the IP address prefix of the computing device;

decrypting, in response to the test cryptographic key equaling the cryptographic key, the encrypted version using the test cryptographic key to obtain the file;

determining, by the computing device, a location of the computing device using a global position system (GPS) device; and mapping, by the computing device, the location to a plurality of coordinates of the geographic region, wherein the cryptographic key further comprises the plurality of coordinates, and wherein the test cryptographic key further comprises the plurality of coordinates.

7. The method of claim 6, further comprising:

determining, by the computing device, an email address of a user operating the computing device; and mapping, by the computing device, the email address to a group email address, wherein the request to encrypt specifies the group email address, wherein the cryptographic key further comprises the group email address, and wherein the test cryptographic key further comprises the group email address.

8. A non-transitory computer readable medium (CRM) storing instructions for limiting access to a file based on an internet protocol (IP) address prefix, the instructions comprising functionality for:

receiving, by a computing device of a plurality of computing devices, a request to decrypt an encrypted version of the file, wherein the encrypted version of the file is generated using a cryptographic key, and wherein the cryptographic key comprises the IP address prefix of the plurality of computing devices specified in a request to encrypt the file, the request identifying the plurality of computing devices having permission to decrypt an encrypted version of the file;

determining, by the computing device, an IP address prefix of the computing device;

generating, by the computing device, a test cryptographic key comprising the IP address prefix of the computing device;

decrypting, in response to the test cryptographic key equaling the cryptographic key, the encrypted version using the test cryptographic key to obtain the file;

determining, by the computing device, a location of the computing device using a global position system (GPS) device; and mapping, by the computing device, the location to a plurality of coordinates of the geographic region, wherein the test cryptographic key further comprises the plurality of coordinates, and wherein the cryptographic key further comprises the plurality of coordinates.

9. The non-transitory CRM of claim 8, the instructions further comprising functionality for:

determining, by the computing device, an email address of a user operating the computing device; and mapping, by the computing device, the email address to the group email address, wherein the request to encrypt specifies the group email address, wherein the cryptographic key further comprises the group email address, and wherein the test cryptographic key further comprises the group email address.

10. A system for limiting access to a file based on an internet protocol (IP) address prefix, comprising:

a first computing device, comprising:
   a first graphical user interface (GUI) that collects a request to encrypt the file, the request identifying the IP address prefix of a plurality of computing devices having permission to decrypt an encrypted version of the file;
   a first key generation engine that generates a cryptographic key comprising the IP address prefix of the plurality of computing devices; and
   an encryption engine that generates the encrypted version of the file using the cryptographic key; and a second computing device, comprising:
   a second graphical user interface (GUI) that collects a request to decrypt the encrypted version of the file;
   a second key generation engine that:
      determines an IP address prefix of the second computing device;
      generates a test cryptographic key comprising the IP address prefix of the second computing device, wherein the plurality of computing devices includes the second computing device; and
   a decryption engine that decrypts, in response to the test cryptographic key equaling the cryptographic key, the encrypted version using the test cryptographic key to obtain the file, wherein:

the first computing device further comprises:
   a first global positioning system (GPS) device that obtains a plurality of coordinates for a geographic region comprising the plurality of computing devices,
   wherein the cryptographic key further comprises the plurality of coordinates; and the second computing device further comprises:
   a second GPS device that obtains a location of the second computing device and maps the location to the plurality of coordinates of the geographic region,
   wherein the test cryptographic key further comprises the plurality of coordinates.

11. The system of claim 10, wherein the request to encrypt identifies at least one selected from a group consisting of a campus within the geographic region and a building within the geographic region.

12. The system of claim 10, wherein the second computing device:

determines an email address of a user operating the second computing device; and maps the email address to the group email address, wherein the request to encrypt specifies the group email address, wherein the cryptographic key further comprises the group email address, and wherein the test cryptographic key further comprises the group email address.

* * * * *